Sept. 21, 1937.  R. MÖLLER  2,093,817
METHOD OF SCANNING FILMS
Filed Feb. 2, 1933  2 Sheets-Sheet 1
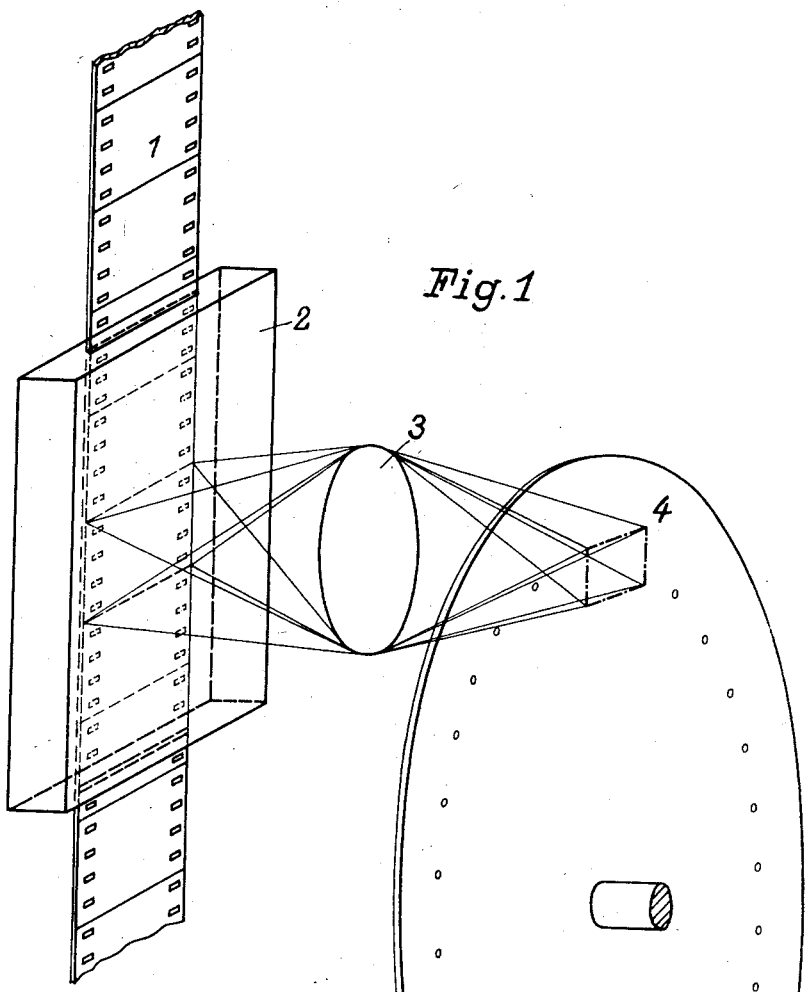
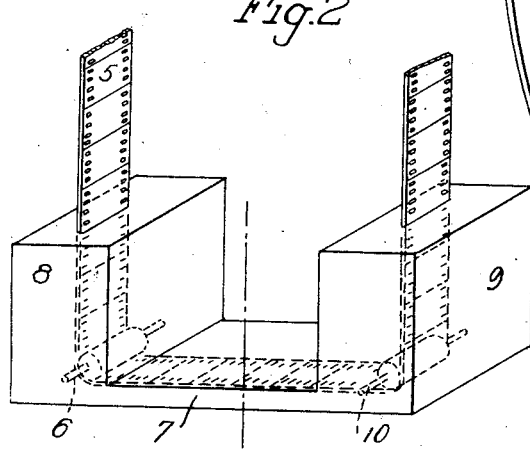
Inventor:
Rolf Möller
By B. Singer, atty.

Sept. 21, 1937.  R. MÖLLER  2,093,817
METHOD OF SCANNING FILMS
Filed Feb. 2, 1933   2 Sheets-Sheet 2
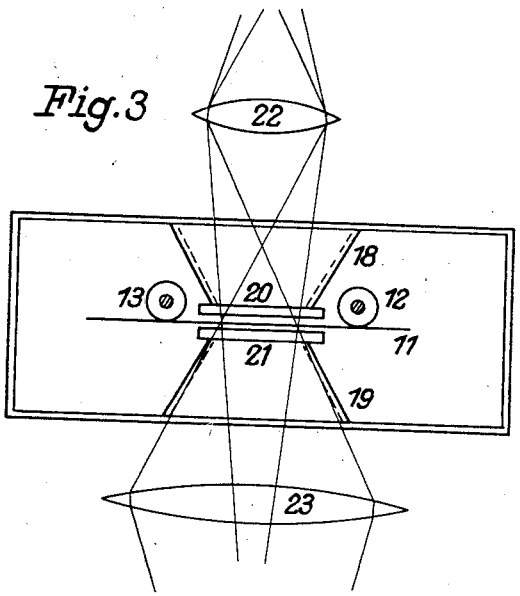
Fig.3
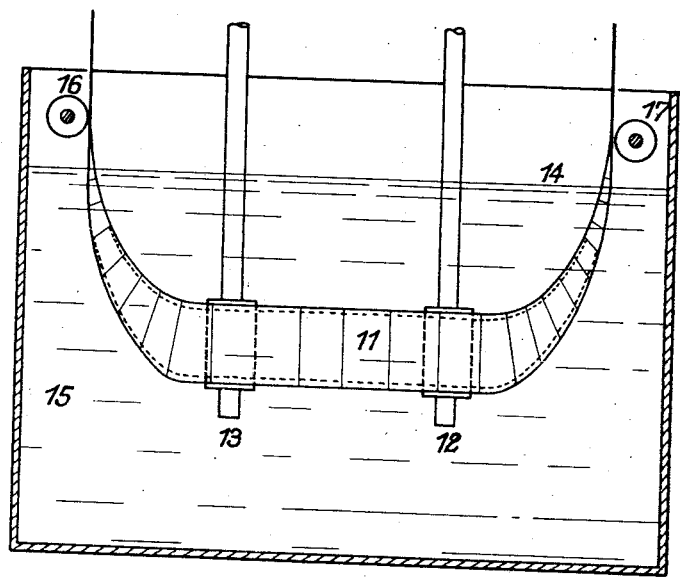
Inventor:
Rolf Möller
By B. Singer, atty.

Patented Sept. 21, 1937

2,093,817

UNITED STATES PATENT OFFICE 2,093,817

METHOD OF SCANNING FILMS

Rolf Möller, Berlin, Germany, assignor to firm Fernseh Aktiengesellschaft, Zehlendorf, near Berlin, Germany Application February 2, 1933, Serial No. 654,954
In Germany February 9, 1932

3 Claims. (Cl. 178—6)

This invention relates to a method of scanning a film, more particularly for television purposes.

In certain instances it is desirable, immediately following the exposure or recordal of the film, to reproduce the film picture in direct optical fashion, or by means of the known television methods, in which the image is scanned point by point and the intensity values converted into A. C. amplitudes. For this purpose it has already been proposed following the exposure merely to develop the film, preferably in a rapid developer, and immediately thereafter to pass the film through the scanning device of a television transmission apparatus.

Since now, generally speaking, a drying of the film requires to be dispensed with, it is necessary to allow the film to pass through the scanning device when still wet, in which condition particles of moisture adhering to the film, or a layer of liquid which is irregular in its moistening action, may act in extremely adverse fashion on the scanning process. Admittedly proposals have been made, which enable these difficulties to be overcome by removal of the moisture mechanically. These methods, however, either require a certain length of time and are complicated to perform, or their object is attained merely to a partial and wholly inadequate extent.

The present invention is based on the fact that a layer or coating of liquid covering the film perfectly evenly at all points will have no influence on the optical reproduction.

Since it would hardly seem feasible to moisten the film, particularly on the side not bearing the emulsion, to such an even or uniform degree that what may be termed the thickness of the coating of moisture on the film is equal at all points, it is proposed in accordance with the invention to scan the film in the liquid itself.

The tank for the liquid is furnished with walls which are parallel to each other and are pervious to light, and between which the film is passed. To avoid unnecessary losses by reason of absorption the liquid is employed in a very thin coating, which is also desirable for the purpose of obtaining proper optical reproduction, as astigmatic distortions and chromatic errors are readily liable to occur in the case of appreciable depth of the liquid and widely spread pencil or bundle of rays.

The invention will now be described more fully with reference to the accompanying drawings, in which Fig. 1 is a diagrammatical representation of the practical development of the invention, all parts having been omitted which are not essential for proper understanding.

Fig. 2 is a perspective view, in diagrammatical form, of a possible embodiment of tank, including means for guiding the film during the scanning operation.

Fig. 3 illustrates diagrammatically in its two parts a modified form of tank.

Referring now to the drawings, the film 1, after leaving the developing and fixing baths, is conducted through a glass container 2, which is filled with a suitable liquid, preferably water.

The film is reproduced on the scanning device (Nipkow disk 4) by means of the lens 3. It will be obvious that means are required for illuminating the image (or the portion of the picture on the Nipkow disk), and that a light-responsive cell is also necessary for receiving and recording the light which is allowed to pass, and these parts, therefore, have not been particularly shown.

Since sealing of the glass container would be a relatively difficult matter at the point where the film is taken through the container at the bottom, it may be desirable to move the film in a horizontal direction, as illustrated for example in Fig. 2.

The film 5, introduced vertically, is caused to adopt a horizontal direction by the roller 6, passes the glass container 7 having flat parallel sides and filled together with the vessels 8 and 9 with a liquid, and is again deflected at right angles by the roller 10. The optical axis of the pencil or bundle of rays passing through the film is indicated by the dotted line. To obtain an accurate guiding of the film it is desirable to make the distance between the rollers 6 and 10 as small as possible, i. e., to make the glass container only of such length as may be required to permit of unobstructed passage of the pencil of rays.

It may be desirable to employ for the scanning of the film merely light of that wave length for which the photographic material is insensitive, in order in this manner to protect a merely developed and unfixed film against additional action of the light.

This is accomplished in simple fashion by adding to the liquid dyestuffs which absorb the light tending to darken the photographic material.

Whereas for the purpose of television transmission in conjunction with normal, dry films kinematographic projectors have variously been employed, in which the advance movement is performed intermittently, the movement of the film in the case of the new method according to the invention will preferably be a continuous one, so that the scanning device will then perform scanning only according to one co-ordinate (in a direction vertical to the movement of the film). The perforations in the Nipkow disk would then be situated, for example, about a circle concentric to the axis of rotation, or a polygonal reflectory wheel may be employed, the reflectory faces of which are all situated parallel to the axis of rotation. In this manner not only a greater degree of protection is afforded to the film, which in its wet condition is readily liable to be deformed, but all parts of the advancing means requiring to be disposed in the liquid are made more simple. Since in the majority of cases it will not be desirable to provide coupling means, such as gear wheels, chains, etc., in the liquid itself, it is preferable to employ an arrangement as illustrated, for example, in Fig. 3.

It will be seen that in this embodiment merely the drums 12 and 13 serving for the advance movement of the film 11 are situated in the tank 15, which is filled with liquid up to the point 14. The shafts of the drums 12 and 13 are conducted vertically towards the top, so that the necessary coupling parts are situated outside of the liquid.

To permit of a more ready introduction and withdrawal of the film into and out of the tank 15, the film is twisted within the tank to the extent of 90°, so that the same rests against the conveying rollers 16 and 17. Owing to the fact that of necessity the tank is relatively wide, whereas the amount of liquid covering the film requires to be thin at the point of passage of the light, two conical or funnel-like portions 18 and 19 are let into the walls of the tank 15, as shown in plan in Fig. 3, and each possesses at the forward end a piece of glass 20 or 21, fitted in liquid-tight fashion. The film 11 passing between the same is illuminated by means of the condenser lens 22, and is reproduced on the scanning device by the objective 23. To ensure that the film will run properly in the tank it may also be desirable to prevent the film from performing a lateral flapping movement by means of a guide carriage.

To cut down as far as possible the time which elapses between the exposure or recordal of the film and the scanning operation, it may frequently be desirable to scan the film in the developing bath, i. e., to fill the tank 15 with developer. The portion of the film between the drums 16 and 12 will then naturally be somewhat longer. It is naturally also possible if desired to replace the pieces of glass 20 and 21 by lenses, in order, for example in the case of the arrangement according to Fig. 3, to allow a maximum amount of light to pass through the film, the condenser lens 22 being reproduced on the objective 23.

Up to now reference has always been made to parallel disposal of the glass faces bounding the liquid. Since now in substance the passage of the rays requires to be optically exact between the scanning device and the film, it is above all important that the liquid between the film 11 in Fig. 3 and the glass wall 21, which is directed towards the objective 23, be of substantially constand thickness at all points. Fulfillment of this condition on the other side of the film between the condenser system 22 or the photo-cell is not so very important, as in this connection it is merely a matter of even illumination of the film, or of conducting to the photo-cell the light which the film allows to pass. The reference, therefore, in the above to constant or uniform thickness of the liquid relates in substance only to that part of the liquid which is situated in the optically reproducing path of the rays.

For the sake of convenience the invention has also been described primarily in its application to the televisional transmission of films. Obviously, however, it is also possible to employ the invention for other purposes in those cases in which the film is reproduced in purely optical fashion, for example for the purpose of checking and controlling the negative or positive immediately following the exposure or copying of a film.

It will also be understood that numerous modifications are quite possible within the meaning of the above description and the annexed claims without departing from the spirit of the invention.

The term "scanning" as employed in the above description and in the following claims is to be applied only in the limited sense as it is understood in the television art and not in any broader aspect. In television the act of scanning is understood to mean, in case of a transparent image, the successive passage of light through each elemental area of the image to a photoelectric cell.

What I claim as new and desire to secure by Letters Patent is:

1. A method of scanning motion picture films for electrical picture transmission which comprises the steps of exposing said film, passing the exposed film continuously downward into a developing liquid, twisting said film within said liquid into a vertical plane normal to its plane of entry thereto, illuminating said film through a substantially uniform layer of said liquid by light to which the developed image is insensitive, forming an optical image of said film through a second substantially uniform layer of said liquid, and scanning said optical image.

2. A method of scanning motion picture films for electrical picture transmission which comprises the steps of exposing said film, passing said film continuously into a body of liquid through a free surface thereof, constraining another surface of said liquid to prevent deformation thereof, passing said film closely adjacent to said constrained surface and parallel thereto, forming an optical image of said film by light to which said film is insensitive through said surface, and scanning said image.

3. A method of scanning motion picture films for electrical picture transmission which comprises the steps of exposing said film, passing said film continuously between and substantially parallel to two closely adjacent parallel surfaces of a body of liquid having therein means for preventing passage of light to which said film is still sensitive, preventing distortion of said surfaces due to the motion of the film therethrough, forming an optical image of said film with light passed through said surfaces, and scanning said image.

ROLF MÖLLER.